United States Patent [19]

Wada et al.

[11] 4,012,458

[45] Mar. 15, 1977

[54] EPOXY RESIN COMPOSITION COMPRISING A CYCLOPENTADIENE TYPE RESIN AND EPOXY HARDENER

[75] Inventors: Akira Wada, Kamakura; Kazunob Karino, Yokohama, both of Japan

[73] Assignee: Nippon Zeon Co., Ltd., Tokyo, Japan

[22] Filed: June 23, 1975

[21] Appl. No.: 589,537

[30] Foreign Application Priority Data

June 25, 1974 Japan .............................. 49-72489

[52] U.S. Cl. ...................... 260/837 R; 260/28.5 B;
260/32.8 A; 260/33.2 EP; 260/33.6 EP;
260/37 EP; 260/831; 260/834; 260/835;
260/836
[51] Int. Cl.² ........................................ C08G 45/04
[58] Field of Search ............................ 260/836, 837

[56] References Cited

UNITED STATES PATENTS 2,951,831  9/1960   Reinhard et al. .................. 260/836
2,962,462  11/1960  Chapin et al. ..................... 260/837

*Primary Examiner*—Theodore E. Pertilla
*Attorney, Agent, or Firm*—Sherman & Shalloway

[57] ABSTRACT

An epoxy resin composition comprising

I. not more than 90% by weight of a cyclopentadiene type resin having a hydroxyl value of 100–300 and a softening point of 50°–170° C., said resin being that obtained by heat-polymerizing a monomeric mixture containing a cyclopentadiene monomer and a hydroxyl-containing monoolefinic monomer copolymerizable therewith.

II. at least 10% by weight of an epoxy resin, and

III. an effective amount of an epoxy resin hardener.

10 Claims, No Drawings

EPOXY RESIN COMPOSITION COMPRISING A CYCLOPENTADIENE TYPE RESIN AND EPOXY HARDENER

This invention relates to an epoxy resin composition having improved properties. More particularly, this invention relates to a new epoxy resin composition consisting of a cyclopentadiene type resin, an epoxy resin and a hardener, which composition is suitably used as coating material, shaped articles, adhesives and seals.

In view of their superior adhesiveness, flexibility, resistance to chemicals, corrosion resistance and electrical properties, the epoxy resins are widely used for such purposes as adhesives, casting of shaped articles, coating materials, etc. However, since the epoxy resins are expensive, the compositions obtained by blending the epoxy resins with a phenolmodified or unmodified coumarone-indene resin, asphalt or tar are usually used. The color tone of these compositions are dark in all instances, and hence when they are used as a coating material their use is limited, say, to an undercoat paint. Further, the coumarone-indene resins had the drawback that their handling was difficult because of their pungent odor. In spite of this drawback, they are being widely used for blending with the epoxy resins in view of their low cost. However, since this resin is a tar derivative, the supply of this resin has shown a marked decline in recent years, with the consequence that it is difficult to obtain.

Accordingly, attempts have been made to develop a substitute for these resins to be used for blending with the epoxy resins, but there has not yet been found a substitute that is fully effective, because few of the developed substitutes are compatible with the epoxy resins and the hardeners. For example, the commercially available aliphatic or aromatic petroleum resins, hydrogenated petroleum resins, phenol modified rosins, rosin esters and maleated cyclopentadiene resins are all poor in their compatibility with the epoxy resins. Even though these are blended with the epoxy resins, only compositions of unsatisfactory transparency, mechanical properties, etc., can be obtained. Again, in U.S. Pat. No. 3,301,918 there is disclosed the instance of blending with the epoxy resins an hydroxy group-containing resin obtained by heat-polymerizing a heterocyclic diene alcohol with cyclopentadiene. However, the compatibility of this resin with the epoxy resins is also insufficient, and hence desirable resinous compositions cannot be obtained.

It is therefore an object of this invention to discover as the resin to be blended with the epoxy resins one not possessing such drawbacks as above described and thus to provide a highly useful epoxy resin composition.

Other objects and advantages of the present invention will become apparent from the following description.

We found that the cyclopentadiene type resin (I) obtained by heat-polymerizing a monomeric mixture containing a cyclopentadiene type monomer and a hydroxyl group-containing monoolefinic monomer copolymerizable therewith and having a hydroxyl value of 100and a softening point of 50°–170° C. possessed exceedingly superior qualifications for use as the resin to be blended with the epoxy resins and that the composition obtained by blending a suitable amount of this cyclopentadiene type resin with the epoxy resin not only had satisfactory compatibility and transparency but also was superior to the unmixed epoxy resin product in its impact strength and resistances to alkalis and hot water.

Thus, in accordance with this invention, there is provided a resinous composition comprising (I) not more than 90% by weight of the aforesaid cyclopentadiene type resin, (II) at least 10% by weight of an epoxy resin and (III) an effective amount of an epoxy resin hardener.

The cyclopentadiene type resin (I) can be synthesized by heat-polymerizing in a pressure vessel a cyclopentadiene type monomer and a hydroxyl-containing monoolefinic monomer copolymerizable therewith for 0.5–20 hours, and preferably 1–10 hours, at a temperature of 200°–300° C., and preferably 250°–280° C., using an inert hydrocarbon solvent such as benzene, toluene and xylene in the absence of a non-radical catalyst such as the cationic catalysts, and thereafter removing the unreacted substances and solvent by means of distillation and other known means of purifying high polymers. When the polymerization temperature is less than 200° C., a resinous product cannot be obtained, and only a waxy product is obtained. On the other hand, when the polymerization temperature exceeds 300° C., an exceedingly discolored resin of exceedingly high softening point or an insoluble gel is formed.

By the term "cyclopentadiene type monomer" is meant a monomer having a cyclopentadiene skeleton, including such compounds as cyclopentadiene, dicyclopentadiene, methylcyclopentadiene, methylcyclopentadiene dimer, as well as the mixture of these compounds. As cyclopentadiene is stably present as dicyclopentadiene at room temperature, dicyclopentadiene is usually considered to be a substance equivalent to cyclopentadiene.

As the hydroxyl-containing monoolefinic monomer copolymerizable with cyclopentadiene, preferred are those having 3–10 carbon atoms, including the unsaturated alcohols such as allyl alcohol, crotyl alcohol, etc., and the oxyalkylene esters of (meth)acrylic acids such as hydroxyethyl acrylate, hydroxyethyl methacrylate, etc. In this invention, allyl alcohol is especially preferred as the monoolefinic monomer.

While it is possible to suitably choose the proportion in which the cyclopentadiene type monomer and the hydroxyl-containing monoolefinic monomer are copolymerized such that the hydroxyl value of the resulting cyclopentadiene type resin (I) comes within the range of 100–300, it is preferred commercially that the porportion of the cyclopentadiene type monomer be made at least 50% by weight of the total monomers. When the amount used of the cyclopentadiene type monomer is less than 50% by weight, there is a tendency that the polymerization yield declines or that the product becomes discolored.

In synthesizing the cyclopentadiene type resin (I), there may be used in addition to the aforesaid cyclopentadiene type monomer and hydroxy-containing monoolefinic monomer other copolymerizable monomers in an amount less than 20% by weight of the total monomers. As examples of such copolymerizable monomers, mention can be made of such vinyl alkanoates as vinyl acetate, vinyl propionate, etc.; such acrylic monomers as acrylonitrile, methacrylonitrile, acrylic acid, methacrylic acid, alkyl acrylates, alkyl methacrylates, etc.; such unsaturated dicarboxylic acids as maleic acid, itaconic acid, etc., and the anhydrides thereof; such unsaturated hydrocarbons as propylene, butene, pentene, cyclopentene, hexene, cyclohexene, styrene, alpha-methylstyrene, indene, butadiene, isoprene, piperylene, etc.; as well as the high boiling mixture containing the $C_4$-$C_{10}$ unsaturated hydrocarbons that forms as a by-product in preparing ethylene by the thermal cracking of naphtha.

The use of the hydroxyl-containing monoolefinic monomer in synthesizing the cyclopentadiene type resin (I) is an important requisite in this invention. The resin obtained by using a monomer having a polar group other than hydroxyl but not the latter, such as vinyl acetate and methyl methacrylate, in toto, instead of the hydroxyl-containing monoolefinic monomer possesses satisfactory compatibility with the epoxy resins but does not possess satisfactory compatibility with the epoxy resin hardeners such as the polyamides. Hence, while such a resin may be mixed with the epoxy resins, the resulting resinous composition is inferior in its resistance to oils. On the other hand, the resin obtained by using a monomer not having a polar group, such as styrene, butadiene and 1,3-pentadiene, in toto, instead of the aforesaid hydroxyl-containing monoolefinic monomer is not compatible at all with the epoxy resins. Hence, even though such a resin is mixed with the epoxy resins, the resulting composition does not yield a satisfactory film coating.

The cyclopentadiene type resin (I) must have a hydroxyl value of 100–300, and preferably 150–280. The compatibility with the epoxy resins of the cyclopentadiene type resin whose hydroxyl value is less than 100 is poor. On the other hand, when the hydroxyl value exceeds 300, a resinous composition which is satisfactory in its resistances to hot water and oils cannot be obtained even though such a cyclopentadiene type resin is mixed with the epoxy resins. This is an entirely unexpected phenomenon when considered from the generally held concept that the resistance to oils of a resinous composition is improved by the introduction of the polar groups in large amounts.

The cyclopentadiene type resin (I) must also have a softening point of 50°–170° C. as measured by the ring and ball method (JIS Method K 2531). A cyclopentadiene type resin (I) whose softening point exceeds 170° C. is poor in its compatibility with the epoxy resins. The resinous composition obtained by mixing such a cyclopentadiene type resin with an epoxy resin yields only a hardened film coating that is nonuniform, coarse and inferior in mechanical strength.

Since the reaction temperature and time, the combination of the starting materials, the proportion in which the starting materials are charged and the amount of the diluent are interrelatedly concerned in obtaining the cyclopentadiene type resin (I) having the aforesaid desired softening point, it is necessary that these conditions be suitably determined. When the combination of the starting materials and the proportion in which the starting materials are charged are fixed, a resin having the desired softening point can be obtained by suitably varying the reaction temperature and time. In general, the softening point of the resulting resin becomes higher in proportion as the reaction temperature becomes higher or as the reaction time becomes longer.

The product obtained by hydrogenating in customary manner the cyclopentadiene type resin obtained by the method described hereinbefore for reducing the discoloration of the resin and to improve its weatherability can also be used as the cyclopentadiene type resin (I) of this invention provided it is one having a hydroxyl value of 100–300 and a softening point of 50°–170° C.

A wide range of epoxy resins can be used as the epoxy resin (II) to be used in this invention. Generally speaking, included are the epoxy resins obtained by the condensation of an epihalohydrin and a polyhydric phenol and which have at least two epoxy groups in its molecules and have an epoxy equivalency of 150–4000. The condensation product of epichlorohydrin and bisphenol A is the most typical of the epoxy resins (II).

As the epihalohydrin to be used for preparing the epoxy resin (II), there can be mentioned those such as epichlorohydrin, epibromohydrin, etc. On the other hand, as the polyhydric phenols, there can be named, for example, resorcinol, the bisphenols, i.e., the condensation products of phenol and such carbonyl compounds as formaldehyde, acetaldehyde, acetone, methyl ethyl ketone, etc., and the novolak resins, i.e., the low molecular weight phenolaldehyde condensation products.

In the epoxy resin composition of this invention the cyclopentadiene type resin (I) and the epoxy resin (II) should be used in such proportions that the former does not exceed 90% by weight while the latter is at least 10% by weight. The desirable properties that are inherently possessed by the epoxy resins are not exhibited in the case of a composition wherein the proportion of the cyclopentadiene type resin (I) exceeds 90% by weight and the proportion of the epoxy resins (II) is less than 10% by weight. For obtaining a composition having a satisfactory resistance to oils and excelling especially in impact strength, resistance to alkalis and resistance to hot water, the cyclopentadiene type resin (I) should be used in an amount ranging from 5 to 80% by weight, and preferably from 10 to 75% by weight.

The epoxy resin composition of this invention must contain along with the aforementioned cyclopentadiene type resin (I) and epoxy resin (II) an effective amount of a hardener (III) because of the necessity for hardening the resinous component when the composition is put to use. Any of the hardeners known as being hardeners for epoxy resins can be used either singly or in combinations of two or more thereof as the hardener (III). Examples of the usable hardeners are the aliphatic polyamides, the organic amines such as diethylenetriamine, triethylenetetraamine, tetraethylenepentamine, p-phenylenediamine, m-phenylenediamine, etc.; the acid anhydrides such as phthalic anhydride, trimellitic anhydride, succinic anhydride, maleic anhydride, etc.; and the complexes of $BF_3$ with such amines as aniline, toluidine, diphenylamine, N-methylaniline, etc. Of these, the aliphatic polyamides, which are known as being room temperature hardeners for the epoxy resins, can be conveniently used for the invention compositions that are to be used for the room temperature type coating materials.

Since the effective amount of these hardeners (III) will vary depending upon their class, the amount used of these hardeners should be determined individually. However, the following amounts may be given by way of illustration. On the basis of 100 parts by weight of the epoxy resin (II), about 20–150 parts by weight are used in the case of the aliphatic polyamides, about 5–30 parts by weight are used in the case of the organic amines, about 30–70 parts by weight are used in the case of the acid anhydrides, and about 1–10 parts by weight are used in the case of the complexes of an amine with $BF_3$.

In addition to the cyclopentadiene type resin (I), the epoxy resin (II) and the hardener (III), the resinous composition of this invention may also be suitably incorporated, as required, with the reactive diluents that are known to be modifiers of the epoxy resins such as alkyl glycidyl ethers; such inorganic fillers as talc, gypsum, alumina, asbestos, etc.; such organic fillers or flexibility imparting agents as phenolic resins, urea resins, melamine resins, polyamide resins, polyester resins, tar, etc.; and pigments.

The resinous composition of this invention that has been described hereinbefore brings about marked improvements in such properties as impact strength, resistance to alkalis and resistance to hot water without impairing the various excellent properties that are inherently possessed by the epoxy resins, for example, while retaining their satisfactory resistance to oils. Hence, the invention composition can be advantageously used for such purposes as coating material, molding material, adhesives, sealing material, etc.

The following non-limitative examples will serve to more fully illustrate the present invention.

REFERENCE EXPERIMENT a. Preparation of cyclopentadiene type resin

Unless otherwise specified, the cyclopentadiene type resin (I) used in this invention was prepared in all instances under the following conditions, using an autoclave of 1-liter capacity.

| | |
|---|---|
| Dicyclopentadiene (variable amount) | Total |
| Copolymerization monomer (variable amount) | 480 grams |
| Xylene | 120 grams |
| Reaction temperature | 260° C. |
| Reaction time | 3 hours |

From the reaction product obtained by carrying out the reaction under the conditions indicated above the solvent and the unreacted starting materials were knowned to obtain the cyclopentadiene type resin (I).

b. Preparation of the sample film coating.

The cyclopentadiene type resin solution (A), epoxy resin solution (B) and hardener solution (C) indicated below were mixed such that the proportions would become those indicated in the several examples given hereinafter to prepare the resinous composition, after which this resinous composition was used to form a film coating on a clean test panel to a thickness of 100 microns, which was then hardened by allowing the coated panel to stand for 7 days at 25° C. In the hereinafter given several examples the samples of hardened coatings obtained in this manner were submitted to various tests.

(A) Cyclopentadiene type resin solution.

| | Parts by weight |
|---|---|
| Cyclopentadiene type resin | 50 |
| Methyl isobutyl ketone | 16 |
| Ethyl Cellosolve | 17 |
| Xylene | 17 |
| Total | 100 |

(B) Epoxy resin solution.

| | Parts by weight |
|---|---|
| Epoxy resin[1] | 50 |
| Methyl isobutyl ketone | 16 |
| Ethyl Cellosolve | 17 |
| Xylene | 17 |
| Total | 100 |

(C) Hardener solution

| | Parts by weight |
|---|---|
| Polyamide[2] | 50 |
| Ethyl Cellosolve | 25 |
| Xylene | 25 |
| Total | 100 |

Note.-
[1] EPIKOTE (a product of Mitsubishi Petrochemical Co.; bisphenol A-epichlorohydrin type).
[2] VERSAMIDE 125 (a product of Dai-ichi General Co.; aliphatic acid polyamide, amine value 345).

EXAMPLE 1

Allyl alcohol was used as the copolymerization monomer, and while varying the proportion in which it was used various cyclopentadiene type resins were synthesized in accordance with the method of Reference Experiment (a). The so obtained resins were then blended with epoxy resins in the proportions indicated below. The film coatings were then evaluated with the results shown in Table 1.

Resins obtained by synthesizing in like manner but using as the copolymerization monomer monomers other than those specified by the present invention instead of allyl alcohol were also evaluated in like manner as to their film coatings. The results obtained in these cases are also shown in Table 1.

| Compounding recipe. | Parts by weight |
|---|---|
| Cyclopentadiene type resin | 25 |
| Epoxy resin (epoxy equivalency 490) | 75 |
| Polyamide | 52 |

Table 1

| Run | Experiment according to present invention | | | | Control Experiment | | | | | |
|---|---|---|---|---|---|---|---|---|---|---|
| | 1 | 2 | 3 | 4 | 5 | 6 | 7 | 8 | 9 | 10 |
| Cyclopentadiene type resin | | | | | | | | | | |
| Monomeric composition (wt. %) | | | | | | | | | | |
| Dicyclopentadiene | 80 | 70 | 50 | — | 100[1] | 90 | 30 | 70 | 70 | 70 |
| Allyl alcohol | 20 | 30 | 50 | — | — | 10 | 70 | — | — | — |
| 1,3-pentadiene | — | — | — | — | — | — | — | 30 | — | — |
| Vinyl acetate | — | — | — | — | — | — | — | — | 30 | — |
| Styrene | — | — | — | — | — | — | — | — | — | 30 |
| Softening point of resin (°C., JIS K 2531) | 105 | 90 | 88 | — | 95 | 153 | 50 | 100 | 90 | 110 |
| Hydroxyl value[2] | 170 | 243 | 277 | — | 0 | 72 | 336 | 0 | 0 | 0 |
| Color (Gardner) | 5 | 5 | 5 | — | 3 | 5 | 11 | 4 | 4 | 5 |
| State of film coating (JIS K 5400) | normal | normal | normal | normal | abnormal | abnormal | normal | abnormal | normal | abnormal |
| Pencil hardness | 2H | 2H | H | 3H | | | 2B | | 3H | |
| Flexural test (dia. | | | | | | | | | | |

Table 1-continued

| Run | Experiment according to present invention | | | | Control Experiment | | | | | |
|---|---|---|---|---|---|---|---|---|---|---|
| | 1 | 2 | 3 | 4 | 5 | 6 | 7 | 8 | 9 | 10 |
| mm JIS K 5400) | below 2 | below 2 | below 2 | below 2 | Poor compatibility with epoxy resin; hence was not measured. | Poor compatibility with epoxy resin; hence was not measured. | below 2 | Poor compatibility with epoxy resin; hence was not measured. | below 2 | Poor compatibility with epoxy resin; hence was not measured. |
| Du Pont impact strength ([gr]×[cm], ½ in. ball; JIS K 5400) | 500 × 50 | 1000 × 50 | 1000 × 50 | 500 × 50 | | | 1000 × 50 | | 1000 × 50 | |
| Erichsen test (mm, JIS Z 2247) | above 8 | above 8 | above 8 | above 8 | | | above 8 | | above 8 | |
| Acid resistance test (JIS K 5400; 10% H₂SO₄ aq., 25° C. 7da.) | + | + | + | + | | | + | | + | |
| Alkali resistance test (JIS K 5400; 10% NaOH aq., 25° C., 7da.) | ++ | ++ | + | − | | | − | | ++ | |
| Hot water resistance test (JIS K 5400; 50° C, 7da.) | ++ | ++ | + | − | | | − | | ++ | |
| Oil resistance test (JIS K 5644; 25° C.7da.) | ++ | ++ | ++ | ++ | | | + | | + | |

Note.
⁽¹⁾Synthesized by using 240 grams of dicyclopentadiene and 360 grams of xylene and heat-polymerizing the components for 3 hours at 250° C.
⁽²⁾The hydroxyl value was determined by the pyridine-acetic anhydride method.
The chemical tests of the coatings were evaluated as follows: Those showing no change in appearance were awarded the designation (++), those somewhat turbid, (+), and those whose turbidity was marked, (−).

The following comments can be made with respect to the results shown in Table 1.

When the coatings obtained from the compositions in which the epoxy resins were incorporated with those resins having a hydroxyl value of 100–300 of the cyclopentadiene type resins prepared from dicyclopentadiene and allyl alcohol (Runs 1–3) are compared with the coating obtained from the composition in which only the epoxy resin was used as the resinous component (Run 4), the resistance to oils is comparable, but there is an improvement in the resistance to alkalis and resistance to hot water, while the impact strength of the former is at least comparable to that of the latter.

The coating obtained from the composition which used the resin whose hydroxyl value was less than 100 (72) of the aforesaid cyclopentadiene type resins (Run 6) and the coating obtained from the composition whose hydroxyl value was zero prepared from dicyclopentadiene alone without copolymerizing allyl alcohol therewith (Run 5) have nonuniform surfaces and moreover are opaque and inferior in their mechanical properties, because both of these resins are not fully compatible with the epoxy resins.

On the other hand, in the case of the coating obtained from the composition which used a cyclopentadiene type resin having a hydroxyl value exceeding 300 (336) (Run 7), the surface is uniform, and the coating is transparent and excels in its mechanical properties, but it is inferior in its resistance to alkalis, resistance to hot water and resistance to oils.

The coating obtained from the composition obtained by incorporating in an epoxy resin a cyclopentadiene type resin prepared from dicyclopentadiene and 1,3-pentadiene or styrene, a monomer not having a polar group (Runs 8 and 10) have undesirable properties as in the case with the coating obtained from the aforesaid compositions of Runs 5 and 6, because the foregoing cyclopentadiene type resin is not compatible with the epoxy resins.

The coating obtained from the composition obtained by incorporating in an epoxy resin a cyclopentadiene type resin prepared from dicyclopentadiene and vinyl acetate, a monomer not possessing the hydroxyl group but possessing another polar group (Run 9), because of the good compatibility of the aforesaid cyclopentadiene type resin with epoxy resins, excels in mechanical properties as well as in its resistance to alkalis and resistance to hot water, but is inferior in its resistance to oils.

EXAMPLE 2

The cyclopentadiene type resin used in the experiment of Run 2 of Example 1 (cyclopentadiene/allyl alcohol = 70/30 weight ratio, softening point 90° C., hydroxyl value 243), an epoxy resin of an epoxy equivalency of 490, and a polyamide were compounded in the various proportions indicated in Table 2 to prepare compositions, which were evaluated as in Example 1. The results obtained are shown in Table 2. It can be seen from the results presented in Table 2 that the coatings obtained from these compositions excel in all instances in their mechanical properties, resistance to alkalis, resistance to hot water and resistance to oils.

Table 2

| Run | 1 | 2 | 3 |
|---|---|---|---|
| Cyclopentadiene type resin (wt. %) | 10 | 50 | 75 |
| Epoxy resin (wt. %) | 90 | 50 | 25 |
| Polyamide (wt. %) | 63 | 35 | 17 |
| State of coating | normal | normal | normal |
| Pencil hardness | 2 H | H | H |
| Flexural test | below 2 | below 2 | below 2 |
| Du Pont impact strength | 500×50 | 1000×50 | 500×50 |
| Erichsen test | above 8 | above 8 | above 8 |
| Acid resistance test | + | + | + |
| Alkali resistance test | + | ++ | + |
| Hot water resistance test | + | ++ | ++ |
| Oil resistance test | ++ | ++ | ++ |

EXAMPLE 3

A coating was prepared using a composition consisting of 75 parts by weight of an epoxy resin of an epoxy equivalency of 190 or 1000, 25 parts by weight of the cyclopentadiene type resin used in Example 2 and 52 parts by weight of a polyamide. The so obtained coating was evaluated as in Example 1 with the results shown in Table 3. It can be seen from the results presented in this table that there are not adverse effects on the properties of the coating even though the epoxy resin used is one having a different epoxy equivalency.

Table 3

| Run | 1 | 2 |
| --- | --- | --- |
| Epoxy equivalency of epoxy resin | 190 | 1000 |
| State of coating | normal | normal |
| Pencil hardness | HB | 2H |
| Flexural test | below 2 | below 2 |
| Du Pont impact strength | 500×30 | 500×50 |
| Erichsen test | above 8 | above 8 |
| Acid resistance test | + | + |
| Alkali resistance test | ++ | ++ |
| Oil resistance test | ++ | ++ |

EXAMPLE 4

A cyclopentadiene type resin was synthesized by the method described in the Reference Experiment from 70% by weight of dicyclopentadiene and 30% by weight of hydroxyethyl methacrylate or crotyl alcohol, a monomer having a hydroxyl group.

An epoxy resin composition similar to that of Example 1 was prepared using this cyclopentadiene type resin. A coating obtained from this composition was evaluated as in Example 1, with the results shown in Table 4. It can be seen that both coatings have excellent properties.

Table 4

| Run | 1 | 2 |
| --- | --- | --- |
| Monomeric composition of the cyclopentadiene | cyclopentadiene/ hydroxyethyl methacrylate | cyclopentadiene/ crotyl alcohol |
| Softening point (° C) | 105 | 83 |
| Hydroxyl value | 128 | 168 |
| Color (Gardner) | 10 | 7 |
| State of coating | normal | normal |
| Pencil hardness | H | H |
| Flexural test | below 2 | below 2 |
| Du Pont impact strength | 1000 × 50 | 500 × 50 |
| Erichsen test | above 8 | above 8 |
| Acid resistance test | + | + |
| Alkali resistance test | + | ++ |
| Hot water resistance test | ++ | ++ |
| Oil resistance test | ++ | ++ |

We claim:

1. An epoxy resin composition comprising
   I. 5-80% by weight of a cyclopentadiene type resin having a hydroxyl value of 100-300 and a softening point of 50°-170° C, said resin consisting essentially of the reaction product of a cyclopentadiene monomer and a hydroxyl-containing monoolefinic monomer copolymerizable therewith and optionally a third monomer copolymerizable therewith by heat-polymerizing at a temperature of 200°-300° C a monomeric mixture containing at least 50% by weight of a cyclopentadiene monomer and less than 50% by weight of a hydroxyl-containing monoolefinic monomer copolymerizable therewith and less than 20% by weight of the total monomers of said third copolymerizable monomer,
   II. 95-20% by weight of an epoxy resin which has at least two epoxy groups in the molecule, and
   III. an effective amount of an epoxy resin hardener.
2. The composition of claim 1 wherein said monoolefinic monomer is a member of the group consisting of allyl alcohol, crotyl alcohol, hydroxyethyl acrylate and hydroxyethyl methacrylate.
3. The composition of claim 2 wherein said monoolefinic monomer is allyl alcohol.
4. The composition of claim 1 wherein said cyclopentadiene type resin (I) has an hydroxyl value of 150-280.
5. The composition of claim 1 wherein said epoxy resin (II) has an epoxy equivalency of 150-4000 and is the condensation product of an epihalohydrin and a polyhydric phenol.
6. The composition of claim 5 wherein said epoxy resin (II) is the condensation product of epichlorohydrin and bisphenol A.
7. The composition of claim 1 wherein the cyclopentadiene type resin (I) comprises from 10 to 75% by weight.
8. The composition of claim 7 wherein said cyclopentadiene type resin (I) has an hydroxyl value of 150-280 and said monoolefinic monomer is selected from the group consisting of allyl alcohol, crotylalcohol, hydroxyethyl acrylate and hydroxyethyl methacrylate; and said epoxy resin (II) has an epoxy equivalency of 150-4000 and is the condensation product of an epihalohydrin and a polyhydric phenol.
9. The composition of claim 8 wherein said monoolefinic monomer is allyl alcohol, said epihalohydrin is epichlorohydrin and said polyhydric alcohol is bisphenol A.
10. The composition of claim 1 wherein said cyclopentadiene type resin (I) is the reaction product of 80 to 50 percent by weight of the cyclopentadiene monomer and 20 to 50 percent by weight of the hydroxyl-containing monoolefinic monomer.

* * * * *